United States Patent
Krogman et al.

(10) Patent No.: US 9,481,583 B2
(45) Date of Patent: Nov. 1, 2016

(54) SYNTHESIS OF METAL OXIDE, TITANIA NANOPARTICLE PRODUCT, AND MIXED METAL OXIDE SOLUTIONS

(71) Applicant: Eastman Chemical Company, Kingsport, TN (US)

(72) Inventors: Kevin Krogman, Santa Clara, CA (US); Siglinde Schmid, San Jose, CA (US); Melissa Fardy, Belmont, CA (US); J. Wallace Parce, Palo Alto, CA (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 14/246,084

(22) Filed: Apr. 5, 2014

(65) Prior Publication Data

US 2014/0220351 A1 Aug. 7, 2014

Related U.S. Application Data

(63) Continuation of application No. PCT/US2012/059147, filed on Oct. 5, 2012.

(60) Provisional application No. 61/544,949, filed on Oct. 7, 2011.

(51) Int. Cl.

| | | |
|---|---|---|
| C01G 23/04 | (2006.01) | |
| C01G 23/047 | (2006.01) | |
| C01G 23/053 | (2006.01) | |
| C09C 1/00 | (2006.01) | |
| C01G 23/00 | (2006.01) | |
| C09C 1/36 | (2006.01) | |
| B82Y 30/00 | (2011.01) | |

(52) U.S. Cl.
CPC ............ *C01G 23/053* (2013.01); *B82Y 30/00* (2013.01); *C01G 23/003* (2013.01); *C01G 23/047* (2013.01); *C09C 1/0084* (2013.01); *C09C 1/3607* (2013.01); *C01P 2002/54* (2013.01); *C01P 2004/64* (2013.01); *C01P 2004/84* (2013.01); *Y10T 428/2982* (2015.01); *Y10T 428/2991* (2015.01)

(58) Field of Classification Search
CPC ..... C09C 1/0084; C09C 1/36; C09C 1/3607; C09C 1/3669; C01G 23/00; C01G 23/003; C01G 23/04; C01G 23/047
USPC ...... 106/436; 423/69, 81, 85, 598, 608, 610; 427/190, 372.2
See application file for complete search history.

(56) References Cited

U.S. PATENT DOCUMENTS

| | | | |
|---|---|---|---|
| 4,410,501 A * | 10/1983 | Taramasso et al. ........... 423/705 | |
| 4,952,457 A | 8/1990 | Cartier et al. | |
| 5,609,943 A | 3/1997 | DeKoven et al. | |
| 5,818,564 A | 10/1998 | Gray et al. | |
| 6,055,088 A | 4/2000 | Fix et al. | |
| 6,627,175 B2 * | 9/2003 | Schoebrechts ................ 423/713 | |
| 8,234,998 B2 | 8/2012 | Krogman et al. | |
| 8,277,899 B2 | 10/2012 | Krogman et al. | |
| 8,689,726 B2 | 4/2014 | Krogman et al. | |
| 2002/0055552 A1 | 5/2002 | Schliesman et al. | |
| 2003/0167878 A1 | 9/2003 | Al-Salim et al. | |
| 2005/0025976 A1 | 2/2005 | Faris | |
| 2006/0029634 A1 | 2/2006 | Berg et al. | |
| 2008/0299036 A1 | 12/2008 | Vitner et al. | |
| 2009/0029077 A1 | 1/2009 | Atanasoska et al. | |
| 2009/0153953 A1 | 6/2009 | Banerjee et al. | |
| 2009/0209665 A1 | 8/2009 | Fu et al. | |
| 2009/0324910 A1 | 12/2009 | Gemici et al. | |
| 2010/0092377 A1 * | 4/2010 | Scott et al. ................... 423/610 | |
| 2010/0208349 A1 | 8/2010 | Beer et al. | |
| 2010/0315693 A1 | 12/2010 | Lam et al. | |
| 2011/0089018 A1 | 4/2011 | Chang et al. | |
| 2011/0135888 A1 | 6/2011 | Xu et al. | |
| 2011/0274767 A1 | 11/2011 | Kato et al. | |
| 2012/0194819 A1 | 8/2012 | Varma | |

FOREIGN PATENT DOCUMENTS

| | | |
|---|---|---|
| EP | 2 343 579 A1 | 7/2011 |
| GB | 1 511 652 A | 5/1978 |
| JP | 11 292537 A | 10/1999 |
| JP | 2010 132514 A | 6/2010 |
| KR | 10-2004-0086912 A | 10/2004 |
| KR | 10-2011-0082625 A | 7/2011 |
| KR | 10-2011-0083729 A | 7/2011 |
| WO | WO 00/10934 A1 | 3/2000 |

OTHER PUBLICATIONS

Nternational Searching Authority, International Search Report and Written Opinion, PCT/US12/59147, Mar. 28, 2013.
Krogman, et al.; "Automated Process for Improved Uniformity and Versatility of Layer-by-Layer Deposition"; Langmuir 2007, 23, pp. 3137-3141.
Lee et al.; "Formation of Nanoparticle-Loaded Microcapsules Based on Hydrogen-Bonded Multilayers", Chem. Mater.; 2005, vol. 17; pp. 1099-1105.
Kim, et al.; "Hydrothermal synthesis of titanium dioxides using basic peptizing agents and their photocatalytic activity"; Chemical Engineering Science; 62 (2007); pp. 154-5159.
PCT International Search Report for International Application No. PCT/US2011/064397 with date of mailing Jun. 6, 2012.
PCT International Search Report for International Application No. PCT/US2012/025138 with date of mailing Oct. 30, 2012.

(Continued)

*Primary Examiner* — Holly Le
(74) *Attorney, Agent, or Firm* — John P. Foryt

(57) ABSTRACT

The disclosure provides methods and materials for preparing a titania nanoparticle product. For example, titania nanoparticle products having desirable optical properties such as a desirable refractive index are prepared according to the methods provided herein.

18 Claims, No Drawings

(56) References Cited

OTHER PUBLICATIONS

PCT International Search Report for International Application No. PCT/US2012/062892 with date of mailing Mar. 29, 2013.
PCT International Search Report for International Application No. PCT/US2012/059142 with date of mailing Apr. 29, 2013.
PCT International Search Report for International Application No. PCT/US2013/059337 with date of mailing Dec. 6, 2013.
USPTO Office Action dated Dec. 4, 2015 in co-pending U.S. Appl. No. 13/861,368.
USPTO Office Action dated Dec. 17, 2015 in co-pending U.S. Appl. No. 14/246,096.
USPTO Notice of Allowance dated Jan. 20, 2016 in co-pending U.S. Appl. No. 14/569,955.
USPTO Notice of Allowance dated Feb. 11, 2016 in co-pending U.S. Appl. No. 14/569,955.
USPTO Office Action dated Feb. 16, 2016 in co-pending U.S. Appl. No. 13/633,809.
USPTO Office Action dated Mar. 18, 2016 in co-pending U.S. Appl. No. 14/267,944.
PCT International Search Report for International Application No. PCT/US2015/063082 with date of mailing Mar. 24, 2016.
USPTO Notice of Allowance dated Apr. 26, 2016 in co-pending U.S. Appl. No. 14/246,096.

* cited by examiner

SYNTHESIS OF METAL OXIDE, TITANIA NANOPARTICLE PRODUCT, AND MIXED METAL OXIDE SOLUTIONS

CROSS-REFERENCE TO RELATED APPLICATIONS

This application claims priority to PCT/US12/59147, filed Oct. 5, 2012, and U.S. Patent Appl. No. 61/544,949, filed Oct. 7, 2011, the contents of which are incorporated herein by reference.

INTRODUCTION

Hydrothermal synthesis involves crystallizing substances from high temperature and pressure aqueous precursor solutions. The process of hydrothermal peptization to convert amorphous titania to crystalline titania has been demonstrated in the past to create alkylammonium compound stabilized metal oxide nanoparticles (Eur J Inorg Chem, 1999, 235-245 and Chemical Engineering Science 62, 2007, 5154). In this process an alkoxide precursor, such as titanium tetraisopropoxide (TIP) is dissolved in isopropyl alcohol (IPA) to prevent premature hydrolysis of the precursor with ambient water vapor before it is desired. The diluted precursor is then dripped into water where it rapidly undergoes hydrolysis. A peptizing agent is chosen, typically from alkylammonium compounds. The mixture is then subjected to elevated temperature and pressure in a hydrothermal reactor. The amorphous material generated during hydrolysis is rapidly dissolved by the peptizing agent at high temperature and pressure and results in crystalline growth.

SUMMARY OF THE INVENTION

In one aspect, there is provided a method for preparing a titania nanoparticle product, the method comprising: (a) combining titanium (IV) tetraalkoxide with tetraalkylammonium hydroxide in a molar ratio of between 4.46:1 and 35.72:1 to form a solution; and (b) exposing the solution to elevated temperature and elevated pressure to provide a titania nanoparticle product.

In embodiments:

The combining in (a) is carried out in the presence of water.

The solution is prepared by adding titanium tetraalkoxide to an aqueous solution of tetraalkylammonium hydroxide.

The method further comprises adding a second metal oxide precursor to the solution of tetraalkylammonium hydroxide and titanium (IV).

The exposing comprises: exposing the solution to elevated temperature and elevated pressure for a first period of time t1; reducing the temperature and pressure; and increasing the temperature and pressure for a second period of time t2.

The method further comprises depositing, in a layer by layer fashion, a first deposition solution comprising a polyelectrolyte and a second deposition solution comprising the titania nanoparticle product prepared according to claim 1, wherein the depositing forms the coating, and wherein the refractive index of the coating is greater than 1.95.

The method further comprises exposing the coating to heat sufficient for calcination, wherein the calcination results in an increased refractive index and improved mechanical durability of the coating.

The method further comprises contacting the titanium (IV) tetraalkoxide with water in an absence of unbound alkoxide prior to the contacting of (a).

The contacting in (a) forms an alcohol hydrolysis product, and wherein no more than 4 equivalents of alcohol are present after formation of the hydrolyzed product.

The method further comprises removing substantially all of the alcohol hydrolysis product formed in (a) prior to (b).

The titania nanoparticle product comprises an additional metal oxide.

The resulting titania nanoparticle product possesses a positive charge in solution.

Also claimed herein is a product prepared according to the above methods.

In another aspect, there is provided a product comprising: titania nanoparticles with an average hydrodynamic diameter of less than 100 nm, wherein the nanoparticles have anatase phase crystal domains; and a neutral complex of the form $H_vM_xTi_yO_z$, wherein M is a peptizing agent, v, x, y, and z are integers.

In embodiments, the neutral complex contacts a surface of the titania nanoparticles, or wherein the neutral complex is present as domains within the titania nanoparticles.

In another embodiments, there is provided a coating comprising alternating layers of the titania nanoparticle product as above and a polyelectrolyte wherein the coating is porous.

In embodiments:

$H_vM_xTi_yO_z$ is referred to as a titanate and has the structure HMTi3O7 or a hydrate thereof, such as the mono-, di-, tri-, tetra-, penta-, or hexa-hydrate.

The titanate has a lamellar structure and is in platelet form.

The platelets rest on the surface of the titania nanoparticles.

The zeta potential of the titania nanoparticles is a positive number.

In another aspect, there is provided a solution comprising the titania nanoparticle product as above and TMAOH.

In embodiments, the ratio of [MxTiyOz]:[TMAOH] in solution is less than 1. In other embodiments, the ratio is greater than 1. In other embodiments, the ratio is 1.

In some aspects, the disclosure provides a method for preparing nanoparticles, the method comprising: (a) combining titanium (IV) tetraalkoxide with tetraalkylammonium hydroxide in a molar ratio of between 16:1 and 20:1 to form a solution; and (b) exposing the solution to elevated temperature and elevated pressure to provide a titania nanoparticle product.

In embodiments:

the combining in (a) is carried out in the presence of water.

the solution is prepared by adding titanium tetraalkoxide to an aqueous solution of tetraalkylammonium hydroxide.

the molar ratio is between 17:1 and 19:1.

the molar ratio is between 17.5:1 and 18.6:1.

the molar ratio is between 17.8:1 and 18.0:1.

the method comprises adding a second metal oxide precursor to the solution of tetraalkylammonium hydroxide and titanium (IV).

the second metal oxide precursor is selected from tetraalkyl orthosilicate and aluminum isopropoxide.

the second metal oxide precursor is added in an amount sufficient to provide between 0.1 and 5 wt % of a second metal oxide in the titania nanoparticle product.

the amount of second metal oxide precursor is sufficient to provide between 0.5 and 2 wt % of the second metal oxide in the titania nanoparticle product.

the second metal oxide is SiO2 or Al2O3.

said exposing comprises: exposing the solution to elevated temperature and elevated pressure for a first period of time t1; reducing the temperature and pressure; and increasing the temperature and pressure for a second period of time t2.

the elevated temperature and elevated pressure are maintained for a period of time t1.

no isopropyl alcohol is added to prepare the solution.

no organic solvents are added to prepare the solution.

said combining is followed by stirring the solution for a period of 4-5 minutes at room temperature and room pressure.

the temperature and pressure are increased from room temperature and room pressure over a period of 1-20 minutes.

the tetraalkylammonium hydroxide is tetramethylammonium hydroxide.

the titanium (IV) tetraalkoxide is titanium tetraisopropoxide.

said exposing provides nanoparticles having an aspect ratio of greater than 1.1 or less than 0.9.

In another aspect is provided a method for forming a coating, the method comprising depositing, in a layer by layer fashion, a first deposition solution comprising a polyelectrolyte and a second deposition solution comprising the titania nanoparticle product prepared as above, wherein the refractive index of the coating is greater than 2.0.

In embodiments:

the first and second deposition solutions are alternately deposited onto a substrate to form one or more bilayers.

10 or more bilayers are formed.

20 or more bilayers are formed.

the coating is not exposed to heat sufficient for calcination of the coating during the deposition process.

the coating is not exposed to heat sufficient for calcination of the coating prior to packaging or use of the coating.

There is further provided an article comprising one or more bilayers, wherein the one or more bilayers comprises a polyelectrolyte and a titania nanoparticle product prepared as above.

The method further comprises preparing a film comprising one or more bilayers, wherein each bilayer comprises a polyelectrolyte and the titania nanoparticles, and wherein the film has a refractive greater than 2.0.

In other aspects, the disclosure provides a method for preparing a metal oxide nanoparticle product, the method comprising: (a) contacting a metal alkoxide with water in an absence of unbound alkoxide to form a hydrolyzed product; (b) contacting the hydrolyzed product from (a) with a counterion to form a peptized product; and (c) pyrolyzing the peptized product from (b) at elevated temperature and elevated pressure to form the metal oxide nanoparticle product.

In embodiments:

the pyrolyzing of (c) provides titania nanoparticles.

the metal alkoxide is titanium tetraisopropoxide.

the contacting in (a) forms an alcohol hydrolysis product, and wherein no more than 4 equivalents of alcohol are present after formation of the hydrolyzed product.

The method comprises removing substantially all of the alcohol hydrolysis product formed in (a) prior to (b).

the counterion is a tetraalkylammonium hydroxide.

the titania nanoparticles are ellipsoidal and have an aspect ratio of greater than 1.1 or less than 0.9.

the contacting of (a) is carried out in the presence of an additional metal oxide precursor, and wherein the titania nanoparticles comprise an additional metal oxide.

the contacting of (a) and the contacting of (b) are carried out in the same container.

In other aspects, the disclosure provides a method for preparing nanoparticles, the method comprising: exposing a solution comprising tetraalkylammonium hydroxide and titanium (IV) tetraalkoxide in a molar ratio of between 16:1 and 20:1 to a temperature and pressure sufficient to produce a titania nanoparticle product.

In embodiments:

the temperature is between 50 and 300° C.

the temperature is between 100 and 200° C.

the pressure is between 0.1 and 3.0 MPa.

the pressure is between 0.5 and 2 MPa.

the solution comprises water.

In another aspect is provided a product prepared as above.

In embodiments:

the titania nanoparticles comprise a metal oxide selected from silica and alumina.

the titania nanoparticles have an aspect ratio greater than 1.1 or less than 0.9.

the titania nanoparticles are ellipsoidal.

In another aspect is provided a product comprising titania nanoparticles having a surface coating of a metal oxide other than titania.

In embodiments:

the metal is silicon or aluminum.

the product has a refractive index greater than 1.95.

In another aspect is provided a coating comprising alternating layers of nanoparticles and a polyelectrolyte, wherein the nanoparticles comprise titania and have an aspect ratio of greater than 1.1 or less than 0.9.

In embodiments:

the coating has a refractive index of greater than 2.0.

the coating is porous.

the polyelectrolyte is a polymer.

the coating is prepared using a Layer-by-Layer (LbL) deposition process.

These and other aspects will be apparent from the disclosure provided herein, including the claims, figures, and examples.

DETAILED DESCRIPTION OF PARTICULAR EMBODIMENTS

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described herein. It is understood that the present disclosure supersedes any disclosure of an incorporated publication to the extent there is a contradiction.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

The term "typically" is used to indicate common practices of the invention. The term indicates that such disclosure is exemplary, although (unless otherwise indicated) not necessary, for the materials and methods of the invention. Thus, the term "typically" should be interpreted as "typically, although not necessarily." Similarly, the term "optionally," as in a material or component that is optionally present, indicates that the invention includes instances wherein the material or component is present, and also includes instances wherein the material or component is not present.

As used herein and unless otherwise specified, the term "solution" refers to a combination of at least one component in a liquid phase with at least one additional component dispersed or dissolved therein. The term includes homogeneous solutions (i.e., where the additional component is completely soluble in the liquid component). The term also includes mixtures (i.e., where the additional component is a solid that is not soluble or is not completely soluble in the liquid component).

In some embodiments, there is provided herein methods for preparing nanoparticles. In some embodiments, the nanoparticles are metal oxide nanoparticles. In some embodiments, the nanoparticles are titanium dioxide (also referred to herein as "titania") nanoparticles.

In some embodiments, the methods of preparation of interest use a metal alkoxide as a starting material. In some embodiments, the alkoxy ligands are selected from $C_1$-$C_{12}$ alkoxy groups. For example, methoxy, ethoxy, propoxy (n-propoxy or isopropoxy), butoxy, and similar groups may be used. Combinations of such groups may also be used in some embodiments. In some embodiments, four such ligands are present, such that the metal alkoxide is a metal tetraalkoxide.

In some embodiments, titanium (IV) tetraalkoxide is used as a starting material. For example, in some embodiments, titanium (IV) tetraisopropoxide (TTIP) is used as a starting material. In some embodiments, the TTIP is used without a diluent present. For example, the TTIP is used without isopropanol present as a diluent.

In some embodiments, the methods of preparation involve hydrolyzing the metal alkoxide. In some embodiments the hydrolysis is carried out by contacting the metal alkoxide with water.

In some embodiments, the hydrolysis is done in the presence of a peptizing agent. In some embodiments, the peptizing agent is a surfactant. In some embodiments, the peptizing agent is ionogenic. In some embodiments, the peptizing agent is a tetraalkyl ammonium ion. In some embodiments, the alkyl ligands are selected from $C_1$-$C_{12}$ alkyl groups. For example, methyl, ethyl, propyl (n-propyl or isopropyl), butyl, pentyl, hexyl, and similar groups may be used. Combinations of such groups may also be used in some embodiments. In some embodiments, the alkyl groups of the peptizing agent are smaller than $C_4$-alkyl groups, such as the $C_1$-$C_3$ alkyl groups listed above. In some embodiments, the anion of the ammonium salt is hydroxide ion. In some embodiments, for example, the tetraalkyl ammonium salt is tetramethylammonium hydroxide (TMAOH). In some embodiments, the peptizing agent is nitric acid ($HNO_3$).

Without wishing to be bound by theory, it is believed that the identity and concentration of peptizing agent (with respect to the concentration of the metal alkoxide) dictates which particle faces grow and how rapidly, thereby dictating final particle size. Excess peptizing agent results in a larger amount of organic content on the surface of the nanoparticles. Such organic content affects the ability of the nanoparticles to deposit during Layer-by-Layer (LbL) deposition, and may further affect optical properties of the nanoparticles and films made therefrom. For example, high organic content on the surface of the nanoparticles may decrease the refractive index of films made from the nanoparticles. However, in some embodiments, too little peptizing agent (again, relative to the concentration of metal alkoxide) results in inadequate peptization and produces nanoparticles that have a broad size distribution. Broad size distribution in the nanoparticles can lead to undesirably poor uniformity in LbL films prepared therefrom.

In some embodiments, the metal alkoxides of interest hydrolyzed in the presence of a peptizing agent but not in the presence of an organic solvent. For example, in some embodiments, organic solvents such as isopropyl alcohol ("IPA") are not present during the hydrolysis and peptizing reactions. In some embodiments, the methods of interest involve minimizing the amount of organic solvent (e.g., IPA) present in the reaction during the hydrolysis and peptizing. In some embodiments, the methods of interest involve minimizing the amount of organic solvent (e.g., IPA) present in solution after the hydrolysis and peptizing reactions.

In some embodiments, the syntheses of interest minimize the IPA content of the final solution. For example, and as indicated herein, in some embodiments, prior to hydrolysis, IPA is eliminated as a diluent for the TTIP. In other embodiments, the concentration of IPA used as a diluent for TTIP is minimized. In some embodiments, the reactor vessel used for high pressure and/or high-temperature formation of titania nanoparticles is fully vented in order to remove IPA via evaporation.

It will be appreciated that hydrolysis of the metal alkoxide creates alcohol moieties (e.g., hydrolysis of TTIP creates isopropyl alcohol), and that such alcohol moieties may remain present during the hydrolysis and peptizing reactions. Thus, in some embodiments, the methods involve carrying out the hydrolysis and peptizing reactions without any added organic solvents such as isopropanol or other alcohols. Furthermore, in some embodiments, the methods involve actively removing alcohol byproducts formed during the hydrolysis reaction (or via any other process occurring during the preparation). For example, in some embodiments, the methods involve removing alcohol molecules via distillation (e.g. azeotropic evaporation), or with the use of size exclusion separation methods (e.g., zeolites, molecular sieves, etc.). In some embodiments, for example, the methods of interest involve removing greater than 50%, or greater than 60%, or greater than 70%, or greater than 80%, or greater than 90%, or greater than 95%, or greater than 99% of the alcohol that results from hydrolysis of the metal alkoxide. In some embodiments, the removal is carried out prior to any pyrolysis steps. In some embodiments, the removal is carried out prior to exposing the hydrolyzed product to elevated temperature and/or elevated pressure.

In some embodiments, the molar ratio of the peptizing agent to the metal alkoxide is controlled. For example, in some embodiments, the molar ratio of the peptizing agent to the metal alkoxide is within the range of 1:1 and 40:1, or within 4.46:1 and 35.72:1, or within 10:1 and 30:1, or within 15:1 and 25:1, or within 17:1 and 19:1, or within 17.5:1 and 18.3:1, or within 17.8 and 18.0. In some embodiments the molar ratio is 17.8:1, 17.86:1, 17.89:1, 17.90:1, or 17.91:1, or 17.92:1, or 17.93:1, or 17.94:1, or 17.95:1. In some embodiments, the molar ratio of the peptizing agent to the metal alkoxide is greater than 5:1, or greater than 8:1, or greater than 10:1, or greater than 12:1, or greater than 15:1, or greater than 18:1. Without wishing to be bound by theory, it is believed that the molar ratio of peptizing agent to metal alkoxide controls the amount of neutral complex (e.g., TMA-titanate) that forms on the surface of the particles.

In some embodiments, the hydrolysis and peptizing reactions are carried out by adding the metal alkoxide to a solution of peptizing agent in water. In some embodiments, the addition is carried out slowly (such as dropwise or via a small stream of metal alkoxide).

In some embodiments, additional materials may be present during the hydrolysis and peptizing reactions. For example, in some embodiments, other metal oxide precursors are added to alter the surface or other properties of the resulting nanoparticles. For example, metal oxide precursors such as tetraethylorthosilane (TEOS) and aluminum isopropoxide (AIP) provide silicon dioxide and aluminum oxide, respectively, in the final nanoparticle product. Combinations of such metal oxide precursors can also be used. Other metal oxides that may be incorporated into the nanoparticles of interest include tin oxide, zinc oxide, iron oxide, zirconium oxide, tungsten oxide, vanadium oxide, molybdenum oxide, nickel oxide, copper oxide, cobalt oxide, and the like, with precursors of such compounds including metal alkoxides and metal salts (e.g. tin alkoxides, zinc acetate, etc).

Inclusion of more than one metal oxide precursor (e.g., TTIP with TEOS, or TTIP with AIP, or TTIP with dissolved zinc oxide) provides mixed metal oxide nanoparticles. In some embodiments, for example, TTIP is used to prepare mixed metal oxide nanoparticles having a desired weight percent of another metal oxide selected from alumina and silica. Such desired weight percent is, in some embodiments, less than or equal to 5, 4, 3, 2, 1.5, 1.0, or 0.5 wt %. In some embodiments, the desired amount is greater than or equal to 0.5, 1.0, 1.5, 2, 3, 4, or 5 wt %.

In some embodiments, the hydrolysis and peptizing reactions described above create metal oxide materials that are formed into nanoparticles. In some embodiments, the nanoparticles are formed by exposing the metal oxide material to elevated temperature and/or elevated pressure. For example, in some embodiments, the methods involve exposing the solution prepared via the hydrolysis and peptizing reactions to increased pressure and increased temperature for a period of time t1. In some such embodiments, the methods further involve depressurizing and/or reducing the temperature after time t1, and then exposing the reaction mixture to elevated temperature and/or elevated pressure for a second period of time t2.

In some embodiments, the elevated temperature used to form the nanoparticles of interest is within the range of 50° C. to 300° C., or within the range of 75° C. to 200° C., or within the range of 100° C. to 175° C., or within the range of 100° C. to 150° C. In some embodiments, the elevated pressure used to form the nanoparticles of interest is within the range of 0.1 MPa to 3 MPa, or within the range 0.1 MPa to about 1.0 MPa, or within the range 0.15 MPa to about 0.5 MPa, or within the range 0.15 MPa to about 0.3 MPa.

In some embodiments, the materials prepared according to the methods of the disclosure are metal oxide nanoparticles. In some embodiments, the materials are mixed metal oxide nanoparticles, meaning that the nanoparticles comprise at least two types of metal oxide materials. Such mixed metal oxide nanoparticles may comprise two, three, or more different types of metal oxide materials.

In some embodiments, the metal oxide nanoparticle have a shape selected from spherical, ellipsoidal, rods, discs, and the like. In some embodiments, the nanoparticles have an aspect ratio (i.e., ratio of height to width) that is greater than or equal to 1.1, 1.2, 1.3, 1.4, or 1.5. In some embodiments, the nanoparticles have an aspect ratio that is less than or equal to 0.9, 0.8, 0.7, or 0.6. For example, in some embodiments, the nanoparticles have an ellipsoidal shape with an aspect ratio of greater than 1.1 or less than 0.9.

In some embodiments, the metal oxide nanoparticles have a surface coating of one material and a core of another material. For example, in some embodiments, the core of the nanoparticles comprises titania and the surface of the nanoparticles comprises another metal oxide such as silica ($SiO_2$) or alumina ($Al_2O_3$). In such embodiments, the surface coating may be incomplete, meaning that core material (e.g., titania) may also be present on the surface. In some embodiments, mixed metal oxide nanoparticles have properties that are advantageous for LbL deposition. For example, an $SiO_2$ coating on titania nanoparticles provides improved binding characteristics for the particle, thereby adding to stability and durability in LbL films prepared from such nanoparticles. In some embodiments, an $SiO_2$ coating increases the refractive index of LbL films prepared using the nanoparticles, or is used to passivate the titania nanoparticle surface to reduce photocatalysis. Also for example, alumina on the surface of titania nanoparticles provides improved stability and/or increases the refractive index of films prepared from such nanoparticles. Also for example, titania nanoparticles having either silica or alumina on the surface passivates the photocatalytic nature of the titania.

In some embodiments, the metal oxide nanoparticles prepared according to the methods herein comprise a neutral complex. In some embodiments the neutral complex is an organic-metal oxide complex. In other embodiments the neutral complex is an inorganic-metal oxide complex. In some embodiments, this neutral complex resides on the surface of the nanoparticle product. In some embodiments the neutral complex resides within the interior of the nanoparticles (e.g., as domains of the neutral complex within the nanoparticles). In some embodiments the neutral complex resides both on the surface and within the nanoparticles. In some embodiments the neutral complex has the formula $H_vM_xTi_yO_z$, wherein M is a peptizing agent, v, x, y, and z are integers. For example, v, x, y, and z may be independently selected from 0, 1, 2, 3, 4, 5, 6, 7, 8, 9, and 10. For example, M may be tetraalkyl ammonium such as tetramethylammonium. In some embodiments, the organic-metal oxide complex is tetramethylammonium titanate (TMA-titanate). In some embodiments, the organic-metal oxide complex is a neutral species. In some embodiments, the organic-metal oxide complex is hydrated. In some embodiments, the organic-metal oxide complex is TMA-$HTi_3O_7$-$5H_2O$. Without wishing to be bound by theory, it is believed that the organic-metal oxide complex resides on the nanoparticle surface and serves to "screen" electrostatic repulsion, or decrease the zeta potential or decrease the Debye length. As a result the nanoparticles are less stable and can flocculate more readily. In some embodiments, this decreased stability can lead to denser packing and correspondingly higher refractive indices when embedded in layer by layer films. In some embodiments, the nanoparticles are stable, or are redispersable, when the pH is decreased through the isoelectric point. In some embodiments, a floc formed by the nanoparticles due to changes in pH can be redispersed upon mixing or agitating at a pH at least 2 or more pH units away from the isoelectric point. Without wishing to be bound by theory, it is believed that the shell of the organic-metal oxide complex on the surface of the nanoparticles provides resistance to permanent aggregation of the nanoparticles. In some embodiments, the organic-metal oxide complex forms domains within the interior of the nanoparticles. In some embodiments, the ratio of organic-metal oxide complex to free organic in solution is greater than one. In some embodiments, the ratio of organic-metal oxide complex to free organic in solution is less than one. In some embodiments, ratio of organic-metal oxide complex to free organic in solution is equal to one. Without wishing to be bound by theory, it is believed that the ratio of organic-metal oxide complex to free organic in solution exist in equilibrium. In some embodiments, the concentration of free organic and free complex can be calculated from measurements of pH or conductivity. In some embodiments, the equilibrium ratio of organic-metal oxide complex to free organic is affected by the time, pressure and temperature of the hydrothermal synthesis process. In some embodiments, a higher temperature and pressure hydrothermal synthesis process will lead to a lower TMA-titanate:free TMA ion ratio. In some embodiments, the nanoparticle product is moisture sensitive. In some embodiments, the nanoparticle product is highly hygroscopic. In some embodiments, the amount of organic-metal oxide complex is selected to increase growth rate while maintaining sufficiently high refractive index.

In some embodiments, the metal oxide nanoparticles prepared according to the methods herein are used in the preparation of coatings. For example, such coatings can be prepared by a Layer-by-Layer (LbL) deposition method. In LbL deposition, a first deposition solution and a second deposition solution are alternately applied to a surface. The first deposition solution comprises a first deposition material having a first bonding moiety, and the second deposition solution comprises a second deposition material having a second bonding moiety, wherein the first and second bonding moieties are complementary bonding moieties. Accordingly, the first and second bonding moieties form a bonding pair. Examples of complementary bonding pairs include electrostatic bonding pairs (i.e., positively and negatively charged moieties), hydrogen bonding pairs (i.e., H-accepting and H-donating groups), and antigen-antibody pairs.

Each deposition of first and second deposition solutions forms a monolayer of the first material and a monolayer of the second material, respectively. The first and second deposition materials bond via the complementary bonds, and together the pair of monolayers is referred to as a bilayer.

LbL deposition is a self-limiting method in terms of film growth. For example, when electrostatic groups are used as the complementary bonding groups, each monolayer continues to grow (i.e., deposition material adheres to the surface) until a surface charge reversal provides sufficient repulsive forces to substantially slow or completely stop further film growth.

In some embodiments, the first deposition material and second deposition material are selected from polyelectrolytes. For example, the first deposition material comprises a polyelectrolyte such as a polyelectrolyte polymer (also referred to herein simply as a "polyelectrolyte"), and the second deposition material comprises polyelectrolyte nanoparticles (also referred to herein as "nanoparticles").

Suitable nanoparticles include those prepared according to the methods provided herein. For example, titania nanoparticles prepared according to the disclosure are suitable. For example, titania nanoparticles comprising $SiO_2$, or titania nanoparticles comprising $Al_2O_3$ are also suitable.

In some embodiments, the coatings prepared using LbL deposition are porous coatings. In some embodiments, the porosity of the coatings ranges from about 0.05 to about 0.6 or more, or from about 0.1 to about 0.5, or from about 0.1 to about 0.4, where porosity is meant to describe the volume fraction of pores in a coating compared with the volume occupied by the pores, solids and liquids in the film.

In some embodiments, the coatings prepared using LbL deposition comprise titania nanoparticle product, using the methods described herein. In some embodiments, the pH of solution containing titania nanoparticle product is adjusted to alter bilayer growth rate and refractive index. In some embodiments, a polymer polyelectrolyte is deposited as a counterpart to the titania nanoparticle product. In some embodiments, the polymer polyelectrolyte is PDAC. In some embodiments, the pH of the polymer polyelectrolyte is adjusted to alter bilayer growth rate and refractive index.

LbL films prepared using titania nanoparticles prepared according to the methods provided herein have one or more advantages over LbL films using conventional titania nanoparticles. Such advantages include higher growth rates and higher indices of refraction (e.g., greater than 1.9, or greater than 2.0, or greater than 2.1, or greater than 2.2, etc.). In some embodiments, such advantages are realized without the need for calcination of the films.

In some embodiments, as described above, the nanoparticles prepared according to the disclosure have an aspect ratio that is different from 1. In some such embodiments, the refractive index of films using such nanoparticles is higher than films using conventional titania nanoparticles. Without wishing to be bound by theory, it is believed that the nanoparticles having non-unity aspect ratios are able to pack more densely than conventional nanoparticles, and thus provide a higher density of titania within the films (thus providing the higher indices of refraction, such as greater than 1.9, or greater than 2.0, etc.). The non-unity aspect ratio of the particles is also believed to contribute to faster LbL film growth rates observed using the nanoparticles prepared according to the disclosure (compared with conventional nanoparticles). Thus, in some embodiments, the disclosure provides methods for preparing nanoparticles have a non-unity aspect ratio (e.g., an aspect ratio less than 0.9 or greater than 1.1, such as for ellipsoidal nanoparticles), and further provides using such nanoparticles in LbL films, wherein the films have a higher index of refraction and/or grow with a higher growth rate compared with films prepared with conventional nanoparticles.

In some embodiments, the nanoparticles prepared according to the disclosure have a refractive index equal to the bulk refractive index of the material prepared according to traditional methods. In some embodiments, such as when mixed metal oxides are used as disclosed herein, the refractive index of the nanoparticles is observed to be intermediate between the bulk refractive indices of the metal oxides used.

In some embodiments, the LbL coatings described herein and using the nanoparticles prepared herein are prepared without the use of a high-temperature treatment step. For example, in some embodiments, the coatings are prepared without the use of a calcination step, where calcination is a thermal treatment sufficient to remove the organic material from the coating, and no calcination is performed after the coatings are prepared (e.g., prior to packaging or use of the coating). For example, in some embodiments, the coatings are prepared by a process wherein the temperature of the surroundings and/or the temperature of the finished coating and/or the temperature of the coating during the preparation process is maintained below the calcination temperature of the materials used in such preparation. For example, in some embodiments, the coatings are maintained at a temperature below 200° C., or below 175° C., or below 150° C., or below 125° C., or below 100° C., or below 75° C., or below 50° C. during the entire preparation process.

It is to be understood that while the invention has been described in conjunction with the preferred specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains.

EXAMPLES

Example 1

Synthesis and Characterization of Titania Nanoparticles

Synthesis procedure. Titania or mixed metal oxide titania ($TiO_2$) nanoparticles (e.g., titania-silica and titania-alumina) are prepared according to the procedure below. Films prepared using such nanoparticles have a high refractive index (e.g., higher than 1.9, and in some cases preferably higher than 2.0). The $TiO_2$ is made in parallel in six pressure cookers and is referred to it as a 'double batch' where each individual pot makes 4 kg of $TiO_2$ (entire batch is 24 kg of $TiO_2$ solution).

Materials: Six times 142.4 g Titanium (IV) isopropoxide (97% TTIP, Sigma-Aldrich). Six times 9.92 g Tetramethylammonium hydroxide (TMAOH, Sigma-Aldrich, 25% wt solution). Tetraethyl orthosilicate (TEOS, Sigma-Aldrich) and aluminum isopropoxide (AIP, Sigma-Aldrich). Six times 4.00 kg deionized water. Extra $DI-H_2O$, Six Cuisinart pressure cookers with Teflon pots. Six stir bars (about 4 cm long and 0.8 cm wide). 250 mL plastic cups. Several plastic pipettes (23 ml and 4 ml). Adjustable pipette for TEOS. Two stir plates placed in chemical hood. Scale for weighing TIP to 0.001 g accuracy placed in chemical hood. Scale for weighing TMAOH to 0.001 g accuracy. Scale for weighing water with minimum 10 kg capacity. Timer, nitrile gloves, oven mitts, Al-totes in buckets, funnel, overhead stirrer for mixing batch at the end. Big container for mixing pots into one batch at the end (capable of holding 24 kg of TiO2).

Instructions: Add 50 g+/−1 g of $DI-H_2O$ to a 250 mL plastic cup. Add 9.92 g of TMAOH to the cup. In parallel, add about 3.7 kg of $DI-H_2O$ to a Teflon pot with stir bar. Pour the TMAOH into the Teflon pot and fill it with $DI-H_2O$ to 4.00 kg. Repeat the foregoing steps with the remaining 5 Teflon pots.

Bring the first two pots onto stir plates and stir at 800 rpm. Add 142.4 g of TIP to a 250 mL plastic cup. Slowly (over about 1 minute) pour the TIP out of the plastic cup on the border of the vortex. Pipette TEOS or add AIP in desired weight fractions, (e.g., 0.9 g TEOS provides 0.5% wt %, 1.8 g TEOS provides 1 wt %, and 3.6 g TEOS provides 2 wt %) in two steps, into the Teflon pot. Stir the solution for about 4.5 minutes. Repeat the foregoing steps with the remaining 5 Teflon pots.

Insert each Teflon pot into its pressure cooker, close the lid, and set the timer for 90 minutes on 'high pressure'. Start the pressure cooker with the top vent open. After 45 minutes close all open vents and verify that the cookers pressurize. After 90 minutes the pressure cookers will stop heating. Open the valves to depressurize. Cancel and restart the pressure cookers for another 90 minutes on 'high pressure' with the valves closed. After 90 minutes the pressure cooker will stop heating. Open the valves to depressurize. Open the lids of the pressure cookers and use the oven mitts to remove the hot $TiO_2$ solutions. Pour all six $TiO_2$ solutions into the big container and add $DI-H_2O$ to 24.00 kg. Stir the $TiO_2$ solution with an overhead stirrer for about 10 to 15 minutes. Store the hot $TiO_2$ solution in Al-totes.

Characterization. Transmission electron micrographs (not shown) were taken of titania nanoparticle product prepared according to the above procedure. The nanoparticles generally have a non-spherical shape and exhibit a length in the range of about 14-23 nm and a width in the range of about 5-11 nm.

Example 2

Preparation of Deposition Solutions Containing $TiO_2$ Nanoparticles

TiO2 solution: Place 1.0 kg of $TiO_2$ solution prepared using the procedures described in Example 1 in a plastic bucket on a stir plate set at 500 rpm. Add desired weight of tetramethyl ammonium chloride (TMACl Sigma Aldrich) to 10 ml of deionized water in vial to dissolve salt. Close lid and shake until fully dissolved. Transfer TMACl to TiO2 solution and stir for 5 minutes. Final pH of the solution is between 11.1 and 11.3.

Polymer solution: 16.17 mL of 20 wt % 100 k-200 k molecular weight poly(diallyl dimethyl ammonium chloride) (PDAC), available from Sigma Aldrich, was added to deionized water with a final volume of 1 liter. The solution was mixed at 500 rpm for 30 minutes. TMAOH was added to the mixture until a pH measurement of 10.0 was achieved.

Rinse solution: TMAOH was added to deionized water until a pH of 10 was achieved.

Example 3

Films Created from the Deposition of $TiO_2$ Nanoparticles

2"×2" borosilicate glass plates (obtained from McMaster-Carr) were used as substrates. An LbL spray deposition apparatus (modeled after the apparatuses described in US Patent Application Publication No. US 2010/0003499 to Krogman et al., as well as Krogman et al., *Automated Process for Improved Uniformity and Versatility of Layer-by-Layer Deposition, Langmuir* 2007, 23, 3137-3141) was used to apply solutions directly to substrates. Using the solutions prepared in Example 2, solutions of polymer (4 s spray time) and $TiO_2$ solution (4 s spray time) were applied alternately, with the rinse solution (10 s spray time) applied in between each deposition solution (i.e., two rinses per bilayer). Fifty (50) bilayers were generated for each film, with each cycle of polymer-rinse-TiO2-rinse resulting in a single bilayer.

Example 4

Characterization of Films

Reflectance measurements were obtained for the films prepared according to the procedure in Example 3 using an F-10 contact UV-Vis reflectance spectrophotometer (FIL-METRICS®, not shown). Using the optical modeling package (TFCalc), results for refractive indices and film thickness could be calculated as a function of TMACl concentration.

For the coatings made from the titania nanoparticle product containing 0.5 wt % $SiO_2$, TMACl was added to the suspension, which had the effect of controlling refractive index and growth rate (denoted nm/bilayer). It was observed that between 75 mM and 130 mM TMACl, refractive indices are greater than 2 with bilayer growth rates relatively constant over this range (between 10-12 nm per bilayer). At the lower TMACl concentration of 50 mM, the bilayer growth rate was nearly negligible. Greater growth rates were achieved (19 nm per bilayer) at the expense of a lower refractive index (e.g. 1.89), when TMACl concentration was increased to 200 mM.

Upon increasing the $SiO_2$ content to 1.0 wt %, the corresponding titania nanoparticle product film properties changed dramatically. Between 65 mM and 75 mM TMACl concentrations, the growth rate was steady (e.g. 10 nanometers per bilayer) and the refractive index was high (e.g. between 2.00-2.03). At a lower TMACl concentrations of 25 mM, the growth rate was only 5 nm per bilayer with a refractive index of 1.93. At a higher TMACl concentration of 100 mM, the growth rate increased to 11.3 nm per bilayer but exhibited a lower refractive index of 1.94.

The $SiO_2$ content was increased even further to 2 wt %. Here the refractive index never increases past 1.965. As the fraction of $SiO_2$ increases, the corresponding refractive index of the particle decreased as expected.

All the results suggested a growth rate plateau in the neighborhood of about 10 nm per bilayer. This is wholly consistent with closely packed nanoparticles with the size and shape based on TEM micrographs of Example 1. An effective diameter of about 12-14 nm can be estimated from the ellipsoidal particles, resulting in growth rates of about 72-81% of the effective nanoparticle dimension. This is consistent with previous work.

An additional experiment which incorporate 1 wt % $Al_2O_3$ into the titania nanoparticle product indicated a comparable refractive index, increasing from 1.96 at a TMACl concentration of 20 mM, peaking at 2.02 for a TMACl concentration of 50 mM and decreasing to 1.94 at a TMACl concentration of 150 mM. It was expected that the refractive index would be higher than for $SiO_2$ (due to the inherently higher RI of bulk $Al_2O_3$ compared with $SiO_2$) but this was not observed. The presence of $Al_2O_3$ changed the growth rate characteristics, eliminating evidence of a growth plateau. The growth rate taken over a range of TMACl concentrations exhibited a substantially linear increase from 4.2 nm per bilayer at 20 mM TMACl to 15 nm per bilayer at 150 mM TMACl.

Example 5

Comparison with Other TiO2 Nanoparticles

Table 1 highlights some measured refractive indices of LbL coatings prepared using $TiO_2$ nanoparticles obtained from commercial suppliers and from the $TiO_2$ nanoparticles synthesized using the methods described herein (i.e., "Prepared $TiO_2$"). In each case, with exception of the "Prepared $TiO_2$" nanoparticles, the refractive indices are well below 2.0.

TABLE 1

Refractive Indices for films prepared with various materials

| Polymer/Nanoparticles | Nanoparticle Supplier | Refractive Index |
| --- | --- | --- |
| PDAC/X500 $TiO_2$ | Titan PE | 1.81 |
| PDAC/A1746 $TiO_2$ | Titan PE | 1.83 |
| PDAC/C380 $TiO_2$ | Titan PE | 1.80 |
| PSS/7012R | Nanoamor | 1.93 |
| PDAC/$TiO_2$ | Prepared $TiO_2$ | 2.02 |

What is claimed is:

1. A method for preparing a titania nanoparticle product, the method comprising:
   (a) combining titanium (IV) tetraalkoxide with tetraalkylammonium hydroxide in a molar ratio of between 4.46:1 and 35.72:1 to form a solution in the absence of added alcohol; and
   (b) exposing the solution to elevated temperature and elevated pressure to provide a titania nanoparticle product.

2. The method of claim 1, wherein the combining in (a) is carried out in the presence of water.

3. The method of claim 1, wherein the combining in (a) comprises combining titanium (IV) tetraalkoxide with tetraalkylammonium hydroxide in a molar ratio of between 4.46:1 and 35.72:1 to form a solution in the absence of an organic solvent.

4. The method of claim 1, wherein the solution is prepared by adding titanium tetraalkoxide to an aqueous solution of tetraalkylammonium hydroxide.

5. The method of claim 1, wherein the combining in (a) is carried out in the presence of water, and wherein the solution is prepared by adding titanium tetraalkoxide to an aqueous solution of tetraalkylammonium hydroxide.

6. The method of claim 1, comprising adding a second metal oxide precursor to the solution of tetraalkylammonium hydroxide and titanium (IV).

7. The method of claim 1, comprising adding a second metal oxide precursor to the solution of tetraalkylammonium hydroxide and titanium (IV), wherein the titania nanoparticle product comprises an additional metal oxide.

8. The method of claim 1, wherein the solution is prepared by adding titanium tetraalkoxide to an aqueous solution of tetraalkylammonium hydroxide, and wherein the method further comprises adding a second metal oxide precursor to the solution of tetraalkylammonium hydroxide and titanium (IV).

9. The method of claim 1, wherein the exposing comprises:
   exposing the solution to elevated temperature and elevated pressure for a first period of time t1;
   reducing the temperature and pressure; and
   increasing the temperature and pressure for a second period of time t2.

10. The method of claim 1, comprising contacting the titanium (IV) tetraalkoxide with water in an absence of unbound alkoxide prior to the combining of (a).

11. The method of claim 1, wherein the combining in (a) forms an alcohol hydrolysis product, and wherein no more than 4 equivalents of alcohol are present after formation of the hydrolyzed product.

12. The method of claim 1, wherein the combining in (a) forms an alcohol hydrolysis product, and wherein no more than 4 equivalents of alcohol are present after formation of the hydrolyzed product, wherein the method further comprises removing substantially all of the alcohol hydrolysis product formed in (a) prior to (b).

13. The method of claim 1, wherein the resulting titania nanoparticle product possesses a positive charge in solution.

14. The method of claim 1, wherein the titania nanoparticle product comprises titania nanoparticles with an average hydrodynamic diameter of less than 100 nm.

15. The method of claim 1, wherein the titania nanoparticle product comprises titania nanoparticles having anatase phase crystal domains.

16. The method of claim 1,
wherein the titania nanoparticle product comprises a titanate of the form $H_v M_x Ti_y O_z$,
wherein M is a tetraalkylammonium ion, v is an integer, and x, y, and z are non-zero integers.

17. A method for forming a coating, the method comprising forming said coating by depositing, in a layer by layer fashion, a first deposition solution comprising a polyelectrolyte and a second deposition solution comprising the titania nanoparticle product prepared according to claim 1, wherein the refractive index of the coating is greater than 1.95.

18. The method of claim 17, wherein the method further comprises exposing the coating to heat sufficient for calcination, wherein the calcination results in an increased refractive index and improved mechanical durability of the coating.

* * * * *